United States Patent [19]

Hiesbock et al.

[11] Patent Number: 4,824,737

[45] Date of Patent: Apr. 25, 1989

[54] TIN-LEAD ALLOY COATED MATERIAL

[75] Inventors: Heinz G. Hiesbock, Modling; Karl Bartl, Vienna, both of Austria

[73] Assignee: Karl Neumayer, Erzeugung und Vertrieb von Kabeln, Drahten, Isolierten Leitungen und Elektromaterial Gesellschaft m.b.H., Gunselsdorf, Austria

[21] Appl. No.: 31,277

[22] Filed: Mar. 30, 1987

[30] Foreign Application Priority Data

Apr. 16, 1986 [AT] Austria ................................ 1008/86

[51] Int. Cl.4 ............................................. B32B 15/02
[52] U.S. Cl. .................................... 428/643; 428/644; 428/645; 428/646; 428/647; 428/674; 428/675
[58] Field of Search ................................ 428/643–647, 428/674, 675

[56] References Cited

U.S. PATENT DOCUMENTS

| 1,509,102 | 9/1924 | Dana | 428/645 |
|---|---|---|---|
| 2,079,479 | 5/1937 | Bennett | 428/644 |
| 2,079,480 | 5/1937 | Bennett | 428/644 |
| 2,079,481 | 5/1937 | Bennett | 428/645 |
| 2,079,482 | 5/1937 | Bennett | 428/644 |
| 2,079,483 | 5/1937 | Bennett | 428/644 |
| 2,079,484 | 5/1937 | Bennett | 428/645 |
| 2,718,494 | 9/1955 | Faust | 425/645 |
| 4,279,967 | 7/1981 | Sawada | 428/644 |
| 4,591,536 | 5/1986 | Hodes et al. | 428/645 |

FOREIGN PATENT DOCUMENTS

| 23031 | 2/1979 | Japan | 428/644 |
|---|---|---|---|
| 151710 | 11/1980 | Japan | 428/607 |
| 017038 | 1/1985 | Japan | 428/674 |

*Primary Examiner*—L. Dewayne Rutledge
*Assistant Examiner*—George Wyszomierski
*Attorney, Agent, or Firm*—Fleit, Jacobson, Cohn & Price

[57] ABSTRACT

Band or wire shaped material consisting of a metal alloy containing at least phosphorus and tin, for example, phosphor bronze or a similar material, and comprisng an outer coating made of a tin-lead alloy. When the phosphorus content of the metal alloy ranges from 0.03 to 0.13 percent by weight, and preferably from 0.05 to 0.06 percent by weight, the tin content of the metal alloy is greater than or equal to 7 percent by weight. When the tin content amounts to less than 7 percent by weight of the metal alloy, the phosphorus content is greater than 0.13 percent by weight of the alloy, and preferably is between 0.27 and 0.35 percent by weight of the alloy.

8 Claims, No Drawings

TIN-LEAD ALLOY COATED MATERIAL

BACKGROUND OF THE INVENTION

The invention is concerned with a band or wire shaped material consisting of a metal alloy that contains at least phosphorus and tin, such as phosphor bronze or a similar material, and comprises an outer coating made of a tin-lead alloy.

Materials of this type are used, by preference, in the electric and electronic industries, where their solderability and corrosion resistance is of the utmost importance. It has been found, however, that materials of this type age as time goes on and lose their wettability, i.e., their solderability, as compared to liquid tin-lead alloys and tin. In the case of these known materials, it is a particular disadvantage that the aging process, that is to say the reduction of solderability, takes place within a relatively short time; periods range commonly from 5 to 12 weeks.

For the improvement of solderability, it is known already to cover a phosphor bronze wire with a layer of copper having a thickness of 2 to 8 microns, and subsequently with a layer of a tin-lead alloy having a thickness of 3 to 5 microns. Subsequently, it is possible to subject the coated wire to a fusion treatment in an electric furnace, in a neutral gas atmosphere. After this treatment, the wire is cooled in the air.

SUMMARY OF THE INVENTION

The objective of the present invention is the creation of a band or wire shaped material comprising an outer layer of the type as described at the outset which has high solderability, but, at the same time, good weldability over a longer period of time, and up to one year.

DETAILED DESCRIPTION OF THE PREFERRED EMBODIMENTS

In accordance with the invention, when the phosphorus content of the metal alloy lies between 0.13 and 0.03 percent by weight, and preferably between 0.05 and 0.06 percent by weight, the tin content of the metal alloy is greater than or equal to 7 percent by weight of the metal alloy. Alternatively, when the tin content of the metal alloy is less than 7 percent by weight of the metal alloy, the phosphorus content of the metal alloy is greater than 0.13 percent by weight of the metal alloy, and preferably is between 0.27 and 0.35 percent by weight of the metal alloy.

Thus, in accordance with the invention, a low phosphorus level and a relatively high tin level in the metal alloy, or, alternatively, of a high phosphorus level and a low tin level in the metal alloy, are combined. A high, age resistant solderability combined with an optimal weldability is achieved in the first case, and an optimal weldability is achieved in the second case.

By way of a further development of the invention, it may be provided that when the phosphorus content of the metal alloy amounts to more than 0.13 percent by weight of the metal alloy, at least one barrier layer is placed between the metal alloy and the outer coating. The interposition of a barrier layer between the metal alloy and the outer coating prevents the phosphorus, of which a high level is present, from diffusing from the metal alloy into the outer coating and from reducing thereby the aging resistant solderability of the band or wire shaped material. On the other hand, weldability, which is reduced due to the low tin level of the metal alloy, is improved.

In accordance with a preferred form of the invention, the resistance $R_1$ of the barrier layer as measured across the material is preferably larger than or equal to, and is no more than 20 percent smaller than, the resistance $R_2$ of the metal alloy. By means of such a ratio between the resistances of the barrier layer and metal alloy, the flow of current during the welding process will be sufficient for fusion of the metal alloy at the welding site, even when the resistance $R_1$ of the barrier layer as measured across the material is 20 percent less than the resistance of the metal alloy.

Especially satisfactory results as to weldability may be achieved, in accordance with a further development of the invention, by having the fusion point of the barrier layer lie above the fusion point of the metal alloy by no more than 150° C.

In accordance with a further advantageous form of the invention, the barrier layer may consist of a copper-tin alloy. A barrier layer of this type has a relatively low fusing point below 1000° C. As a consequence thereof, fusion of the layers to be joined may be achieved reliably. In this way, diffusion of phosphorus through the barrier layer and into the outer coating is prevented, so that aging resistant solderability and good weldability may be achieved when metals or alloys having high or low levels of phosphorus are used.

In addition, the invention is concerned with an advantageous method for producing an outer coating on a metal alloy that contains at least phosphorus and tin, and is characterized by the fact that a copper-tin alloy is applied to the metal alloy galvanically, and that subsequently a tin-lead alloy is applied galvanically.

Another advantageous method for producing an outer coating on a metal alloy that contains at least phosphorus and tin, in accordance with the invention, may be galvanic application of tin to the metal alloy and the subsequent heat treatment of material layered in that way and application of a tin-lead alloy. As a consequence of the heat treatment, a diffusion of copper and the formation of a tin-bronze alloy as a barrier layer take place. This variation of the embodiment of the invention may be further developed, in accordance with the invention, by applying the tin-lead alloy galvanically and performing the heat treatment thereafter only.

EXAMPLES

| Example No.: | Sn % by Weight | P % by Weight | Cu | Barrier Layer |
|---|---|---|---|---|
| I | 8 | 0.1 | Remainder | ⊖ |
| II | 8 | 0.06 | Remainder | ⊖ |
| III | 5 | 0.3 | Remainder | Sn—Cu Alloy 8% by Weight Sn 92% by Weight Cu Thickness: 2 μm |

We claim:

1. A band or wire shaped material consisting essentially of a bronze metal alloy with a phosphorus content of from about 0.03 to about 0.35 percent by weight and a tin content of from about 5 to about 8 percent by weight and having an outer coating made of a tin-lead alloy, the phosphorus content of the bronze metal alloy ranging from about 0.03 to about 0.13 percent by weight of the bronze metal alloy when the tin content of the bronze metal alloy is greater than or equal to about 7 percent by weight of the bronze metal alloy, and when the tin content is less than about 7 percent by weight of the bronze metal alloy, the phosphorus content is greater than about 0.13 percent by weight of the bronze metal alloy.

2. Material in accordance with claim 1, wherein the phosphorus content of the bronze metal alloy ranges from about 0.05 to about 0.06 percent by weight of the bronze metal alloy when the tin content of the bronze metal alloy is greater than or equal to about 7 percent by weight of the bronze metal alloy.

3. Material in accordance with claim 1, wherein the phosphorus content of the bronze metal alloy ranges from about 0.27 to about 0.35 percent by weight of the bronze metal alloy when the tin content of the bronze metal alloy is less than about 7 percent by weight of the bronze metal alloy.

4. Material in accordance with claim 1, characterized by the fact that when the phosphorus content of the bronze metal alloy is greater than 0.13 percent by weight of the bronze metal alloy, at least one barrier layer is provided between the bronze metal alloy and the outer coating.

5. Material in accordance with claim 2, characterized by the fact that a resistance ($R_1$) of the barrier layer as measured across the material is larger than or equal to a resistance ($R_2$) of the bronze metal alloy.

6. Material in accordance with claim 2, characterized by the fact that a resistance ($R_1$) of the barrier layer as measured across the material is smaller, by no more than 20%, then a resistance ($R_2$) of the bronze metal alloy.

7. Material in accordance with claim 2, characterized by the fact that the melting point of the barrier layer is higher, by no more than 150° C., than the melting point of the bronze metal alloy.

8. Material in accordance with claim 2, characterized by the fact that the barrier layer consists of a copper-tin alloy.

* * * * *